(12) United States Patent
Musgrave et al.

(10) Patent No.: US 8,399,587 B2
(45) Date of Patent: *Mar. 19, 2013

(54) MINI-RANDOM COPOLYMER RESINS HAVING IMPROVED MECHANICAL TOUGHNESS AND RELATED PROPERTIES SUITABLE FOR THIN WALL THERMOFORMING APPLICATIONS

(75) Inventors: Mike Musgrave, Houston, TX (US); LuAnn Kelly, Friendswood, TX (US); Peter Selg, Masnuy-St-Pierre (BE)

(73) Assignee: Fina Technology, Inc., Houston, TX (US)

( * ) Notice: Subject to any disclaimer, the term of this patent is extended or adjusted under 35 U.S.C. 154(b) by 450 days.

This patent is subject to a terminal disclaimer.

(21) Appl. No.: 12/642,821

(22) Filed: Dec. 20, 2009

(65) Prior Publication Data

US 2010/0160533 A1 Jun. 24, 2010

Related U.S. Application Data

(63) Continuation-in-part of application No. 11/005,918, filed on Dec. 7, 2004, now Pat. No. 7,674,869.

(60) Provisional application No. 60/527,797, filed on Dec. 8, 2003.

(51) Int. Cl.
*C08F 210/06* (2006.01)
(52) U.S. Cl. ............ 526/348; 528/396
(58) Field of Classification Search ............... 526/352, 526/348

See application file for complete search history.

(56) References Cited

U.S. PATENT DOCUMENTS

| | | | | |
|---|---|---|---|---|
| 5,958,566 | A * | 9/1999 | Wheat et al. | 428/215 |
| 6,476,172 | B1 * | 11/2002 | Wachowicz et al. | 526/348.1 |
| 6,733,719 | B2 * | 5/2004 | DiNardo et al. | 264/564 |
| 7,094,856 | B1 * | 8/2006 | McLeod et al. | 526/348.1 |
| 7,473,750 | B2 * | 1/2009 | Musgrave et al. | 526/348 |
| 7,655,582 | B2 * | 2/2010 | McLoughlin et al. | 442/381 |
| 2004/0122196 | A1 * | 6/2004 | Pierini et al. | 526/351 |

* cited by examiner

*Primary Examiner* — Rip A. Lee

(57) ABSTRACT

Propylene random copolymer compositions are described herein. The compositions generally include a propylene random copolymer including from about 95.0 wt. % to about 99.0 wt. % propylene and from about 0.2 wt. % to about 0.8 wt. % ethylene, an additive selected from clarifiers, nucleators and combinations thereof and a stabilizer, wherein the propylene random copolymer exhibits a melt flow rate of from about 0.5 g/10 min. to about 4.0 g/10 min., a molecular weight distribution of from 5 to 10 and wherein the propylene random copolymer composition exhibits a flexural modulus of from about 180,000 psi to about 260,000 psi.

8 Claims, 3 Drawing Sheets

MINI-RANDOM COPOLYMER RESINS HAVING IMPROVED MECHANICAL TOUGHNESS AND RELATED PROPERTIES SUITABLE FOR THIN WALL THERMOFORMING APPLICATIONS

CROSS-REFERENCE TO RELATED APPLICATIONS

This application claims the benefit of U.S. patent application Ser. No. 11/005,918, filed Dec. 7, 2004, which has issued as U.S. Pat. No. 7,674,869, is incorporated by reference herein and which claims the benefit of U.S. Provisional Patent Application Ser. No. 60/527,797, filed Dec. 8, 2003.

FIELD

Embodiments of the present invention generally relate to propylene random copolymer compositions.

BACKGROUND

Polypropylene materials are among the most versatile and commonly used thermoplastics in the world today. Commercial grade polypropylenes are typically produced using either a Ziegler-Natta or metallocene catalyst mechanism in a polymerization process. Many industries, such as the packaging industry, utilize these polypropylene materials in various manufacturing processes, such as extrusion, injection molding, thermoforming, and blow molding to create a variety of finished goods.

Within the packaging industry, there are a number of unique applications that ideally require strong and substantially clear polymers. Medical articles, food storage containers, and other products that can readily be formed by thermoforming and blow molding techniques are either in direct contact with blood or other bodily fluids or with food or other items that are to be ingested or taken into the body. Thus, it would be desirable to use polymers having high clarity and strength and a very low extractables content for these applications. Accordingly, there is a need for Ziegler-Natta polypropylene blends having improved thermoforming and blow molding characteristics while retaining outstanding toughness, stiffness, strength, and clarity for demanding food or drug packaging applications, especially for cold temperature end use applications.

SUMMARY

Embodiments of the present invention include propylene random copolymer compositions. The compositions generally include a propylene random copolymer including from about 95.0 wt. % to about 99.0 wt. % propylene and from about 0.2 wt. % to about 0.8 wt. % ethylene, an additive selected from clarifiers, nucleators and combinations thereof and a stabilizer, wherein the propylene random copolymer exhibits a melt flow rate of from about 0.5 g/10 min. to about 4.0 g/10 min., a molecular weight distribution of from 5 to 10 and wherein the propylene random copolymer composition exhibits a flexural modulus of from about 180,000 psi to about 260,000 psi.

DETAILED DESCRIPTION

Introduction and Definitions

Figure 1:
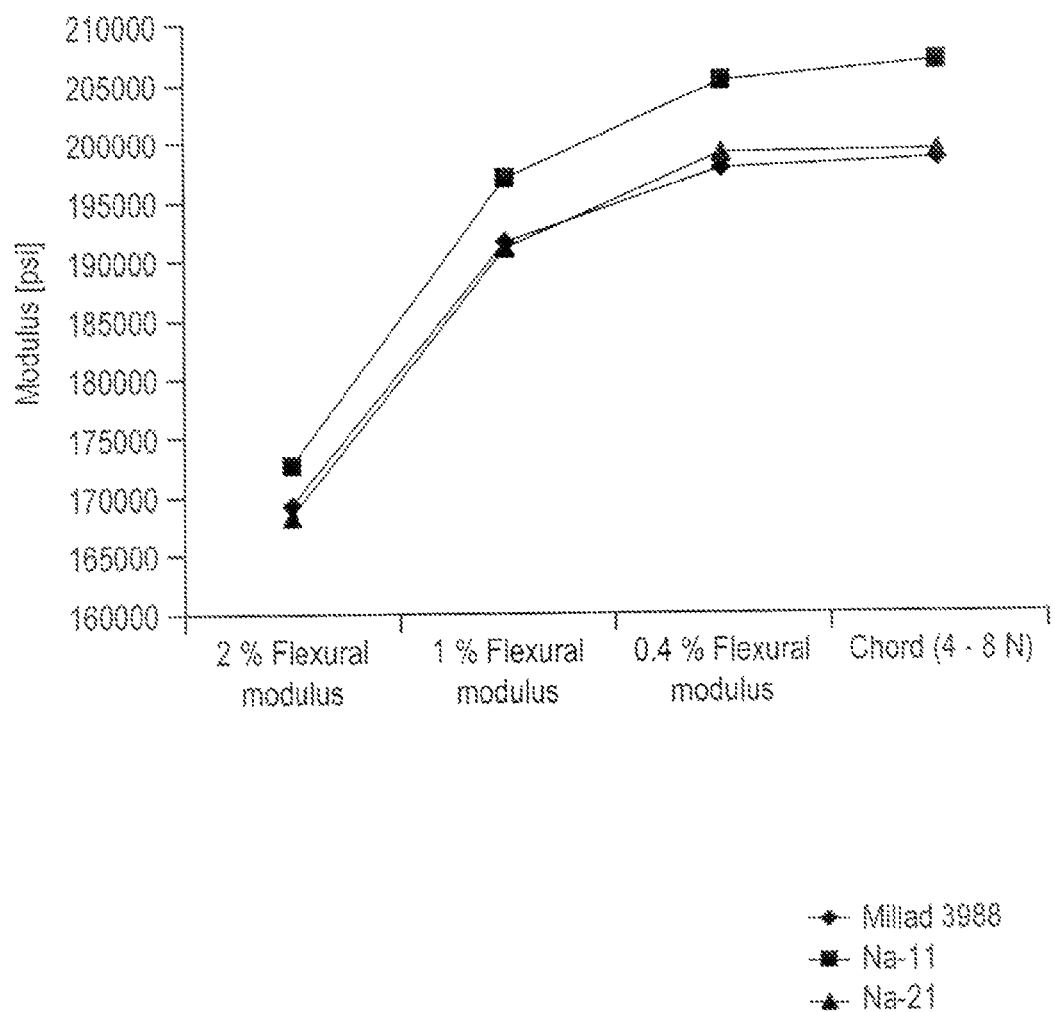
FIG. 1 illustrates the flexural moduli of random ethylene-propylene copolymers formulated with different nucleating agents.
Figure 2:
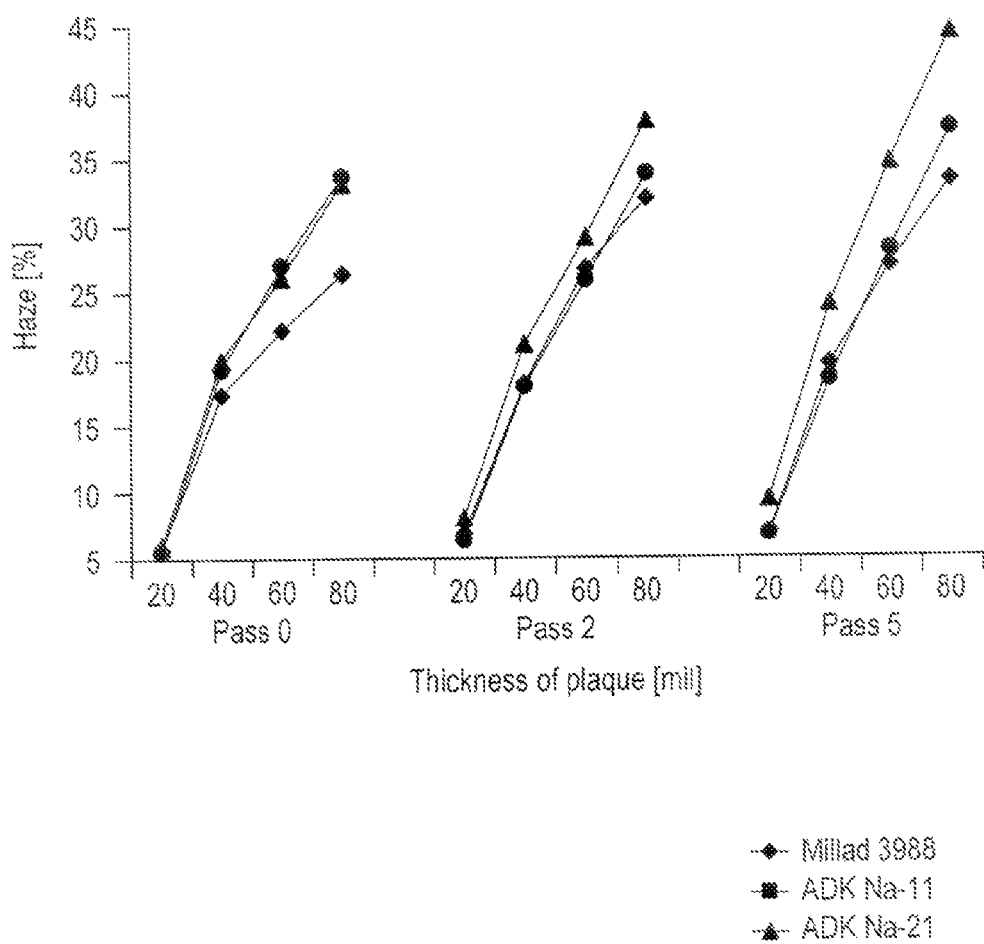
FIG. 2 illustrates haze as a function of the plaque thickness for random ethylene-propylene copolymers formulated with different nucleating agents.
Figure 3:
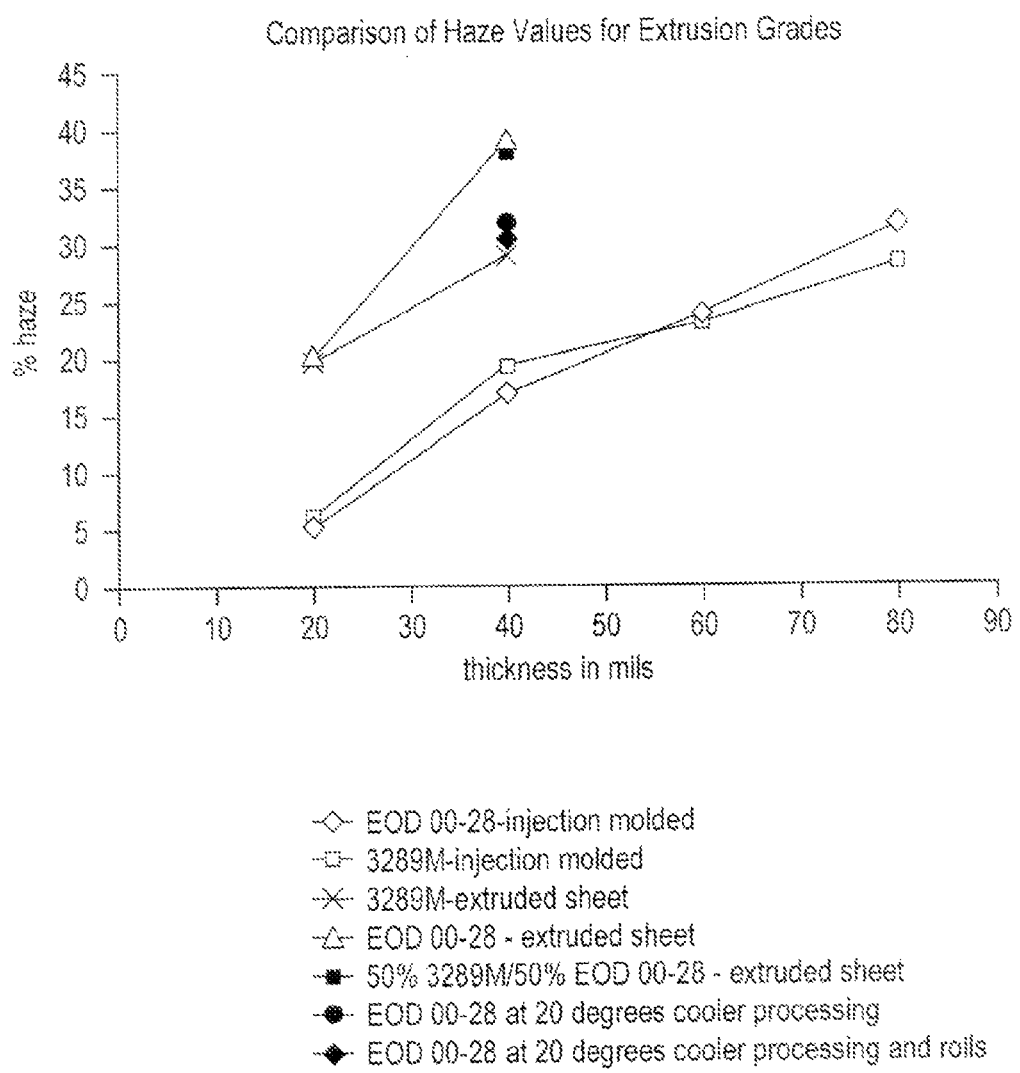
FIG. 3 illustrates haze as a function of the plaque thickness for different extrusion grades of a random ethylene-propylene copolymer, a conventional PP homopolymer, and a combination thereof.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Catalyst Systems

Catalyst systems useful for polymerizing olefin monomers include any suitable catalyst system. For example, the catalyst system may include chromium based catalyst systems, single site transition metal catalyst systems including metallocene catalyst systems, Ziegler-Natta catalyst systems or combinations thereof, for example. The catalysts may be activated for subsequent polymerization and may or may not be associated with a support material, for example. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through $\pi$ bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled hack into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5.352.749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a hulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C. for example. Reaction heat may be removed through the loop wall via any suitable method, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Embodiments of the invention include modifying the polymer with a modifier, which may occur in the polymer recovery system or an another suitable manner. As used herein, the term "modifier" refers to an additive that effectively accelerates phase change from liquid polymer to semi-crystalline polymer (measured by crystallization rates) and may include commercially available nucleators, clarifiers and combinations thereof (which will be referred to herein, without limitation, as nucleators).

The nucleators may include any nucleator known to one skilled in the art. For example, non-limiting examples of nucleators may include carboxylic acid salts, including sodium benzoate, talc, phosphates, metallic-silicate hydrates, organic derivatives of dibenzylidene sorbitol, sorbitol acetals, organophosphate salts and combinations thereof. In one embodiment, the nucleators are selected from Amfine® Na-11 and Na-21, commercially available from Amfine Chemical, Milliken® HPN-68, Hyperform® HPN-68 and Millad® 3988, commercially available from Milliken Chemical.

In an embodiment, the nucleators may be used in concentrations of from about 5 ppm to about 3500 ppm, or from about 400 ppm to about 2000 ppm or from about 1700 ppm to about 2200 ppm, for example.

The plurality of additives may contact the polymer by any method known to one skilled in the art. For example, the additives may contact the polymer prior to extrusion (within the polymerization process) or within the extruder, for example. In one embodiment, the additives contact the polymer independently. In another embodiment, the additives are contacted with one another prior to contacting the polymer. In one embodiment, the contact includes blending, such as mechanical blending, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include propylene based polymers. As used herein, the term "propylene based" is used interchangeably with the terms "propylene polymer" or "polypropylene" and refers to a polymer having at least about 50 wt. %. or at least about 70 wt. %, or at least about 75 wt. %, or at least about 80 wt. %, or at least about 85 wt. % or at least about 90 wt. % polypropylene relative to the total weight of polymer, for example.

The propylene based polymers may have a melting point ($T_m$) (as measured by DCS) of at least about 110° C., or from about 115° C. to about 175° C., for example.

The propylene based polymers may include about 15 wt. % or less, or about 12 wt. % or less 12, or about 10 wt. % or less, or about 6 wt. % or less, or about 5 wt. % or less, or about 4 wt. % or less or from about 3.0 wt. % to about 5.5 wt. % of xylene soluble material, for example.

In one or more embodiments, the polymers include propylene based random copolymers. Unless otherwise specified, the term "propylene based random copolymer" refers to those copolymers composed primarily of propylene and an amount of other comonomers, wherein the comonomers form at least about 0.2 wt. %, or at least about 0.8 wt. %, or from about 0.2 wt. % to about 2.0 wt. %, or from about 0.2 wt. % to about 1.0 wt. %, or from about 0.2 wt. % to about 0.8 wt. % comonomer relative to the total weight of polymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

The propylene based random copolymers may exhibit a melt flow rate of at least about 0.5 dg/min., or from about 0.5 dg/min. to about 30 dg/min., or from about 0.5 dg/min. to about 50 dg/min. or from about 2.0 dg/min. to about 5 dg/min., for example.

The propylene based random copolymers may exhibit a 1% flexural modulus (as measured by ASTM D-790) of from about 160,000 psi to about 260,000 psi, or from about 180,000 psi to about 240,000 psi or from about 190,000 psi to about 235,000 psi, for example.

The propylene based random copolymers may exhibit a haze of from about 5% to about 40% or from about 5% to about 20%, for example.

In one or more embodiments, the propylene based random copolymers may exhibit a weight average molecular weight ($M_w$) (as measured by gel permeation chromatography) of from about 260,000 to about 600,000, for example.

In one or more embodiments, the propylene based random copolymers may exhibit a molecular weight distribution ($M_w/M_n$) of from about 5 to about 10 or greater than 5, for example.

In one or more embodiments, the propylene based polymers include stereospecific polymers. As used herein, the term "stereospecific polymer" refers to a polymer having a defined arrangement of molecules in space, such as isotactic and syndiotactic polypropylene, for example. The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

In one or more embodiments, the polymers include isotactic polypropylene. As used herein, the term "isotactic polypropylene" refers to polypropylene having a crystallinity measured by $^{13}C$ NMR spectroscopy using meso pentads (e.g., % mmmm) of greater at least about 60%, or at least about 70%, or at least about 80%, or at least about 85% or at least about 90%, for example.

The isotactic polypropylene may have a melting point ($T_m$) of from about 130° C. to about 175° C., or from about 140° C. to about 170° C. or from about 150° C. to about 165° C., for example. The isotactic polypropylene may have a molecular weight ($M_w$) (as measured by gel permeation chromatography) of from about 2,000 to about 1,000,000 or from about 100,000 to about 800,000, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

In one or more embodiments, the polymer article includes thermoformed articles.

It has been observed that embodiments of the invention result in polymer articles exhibiting enhanced stillness.

While the foregoing is directed to embodiments of the present invention, other and further embodiments of the invention may be devised without departing from the basic scope thereof and the scope thereof is determined by the claims that follow.

What is claimed is:

1. A propylene random copolymer composition comprising:
 a propylene random copolymer comprising:
  from about 95.0 wt. % to about 99.0 wt. % propylene; and
  from about 0.2 wt. % to about 0.8 wt. % ethylene;

an additive selected from clarifiers, nucleators and combinations thereof; and a stabilizer, wherein the propylene random copolymer exhibits a melt flow rate (ASTM D-1238) of from about 0.5 g/10 min. to about 4.0 g/10 min., a molecular weight distribution of from 5 to 10 and wherein the propylene random copolymer composition exhibits a 1% flexural modulus (ASTM D-790) of from about 180,000 psi to about 260,000 psi.

2. The random copolymer composition of claim 1, wherein the propylene random copolymer composition is formed by a Zieger-Natta catalyst.

3. A polymer article comprising the random copolymer composition of claim 1.

4. The random copolymer composition of claim 1 further comprising a fluoropolymer.

5. The random copolymer composition of claim 1, wherein the additive is present in an amount of from about 900 ppm to about 3500 ppm.

6. The random copolymer composition of claim 1, wherein the propylene random copolymer composition exhibits a 1% flexural modulus of from about 180,000 psi to about 240,000 psi.

7. The random copolymer composition of claim 1, wherein the propylene random copolymer composition exhibits a 1% flexural modulus of from about 180,000 psi to about 235,000 psi.

8. The random copolymer composition of claim 1, wherein the propylene random copolymer composition exhibits a 1% flexural modulus of from about 190,000 psi to 235,000 psi.

* * * * *